(12) United States Patent
Fleming et al.

(10) Patent No.: US 8,171,533 B2
(45) Date of Patent: May 1, 2012

(54) MANAGING WEB SINGLE SIGN-ON APPLICATIONS

(75) Inventors: Brian J. Fleming, Richmond Hill (CA); Wan Ngain W. Lee, North York (CA); Craig Malton, Markham (CA); Esther Yu, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 12/240,337

(22) Filed: Sep. 29, 2008

(65) Prior Publication Data

US 2010/0083361 A1 Apr. 1, 2010

(51) Int. Cl.
*H04L 29/06* (2006.01)
*H04L 9/32* (2006.01)
*G06F 15/16* (2006.01)

(52) U.S. Cl. .............................................. 726/8; 726/14
(58) Field of Classification Search .................. None
See application file for complete search history.

(56) References Cited

U.S. PATENT DOCUMENTS

| | | | |
|---|---|---|---|
| 6,961,776 B1 * | 11/2005 | Buckingham et al. | 709/229 |
| 7,130,877 B2 * | 10/2006 | McNeely et al. | 709/201 |
| 7,206,803 B1 * | 4/2007 | Bendel et al. | 709/202 |
| 7,243,369 B2 | 7/2007 | Bhat et al. | |
| 7,698,398 B1 * | 4/2010 | Lai | 709/223 |
| 7,730,089 B2 * | 6/2010 | Campbell et al. | 707/781 |
| 7,739,512 B2 * | 6/2010 | Hawkes | 713/182 |
| 7,831,693 B2 * | 11/2010 | Lai | 709/220 |
| 8,069,435 B1 * | 11/2011 | Lai | 717/106 |
| 2004/0110462 A1 * | 6/2004 | Forstadius | 455/3.01 |
| 2009/0083240 A1 * | 3/2009 | Nolan et al. | 707/4 |
| 2009/0235329 A1 * | 9/2009 | Chavez et al. | 726/3 |

* cited by examiner

*Primary Examiner* — Christopher Revak
(74) *Attorney, Agent, or Firm* — Cantor Colburn LLP; Libby Toub (57) ABSTRACT

A method of managing a web single sign-on (SSO) application with a common set of uniform resource locators (URLs) includes defining a first servlet mapping including a description of a protected URL resource pattern, defining a second servlet mapping including a description of an unprotected URL resource pattern, determining display logic support to establish if display logic of the web SSO application supports both the first servlet mapping and the second servlet mapping, configuring the display logic of the web SSO application based on the determination, defining an intercepting filter, and registering URL patterns for the common set of URLs in the intercepting filter, the URL patterns including definitions of the protected URL resource pattern and the unprotected URL resource pattern.

20 Claims, 8 Drawing Sheets

MANAGING WEB SINGLE SIGN-ON APPLICATIONS

BACKGROUND

Embodiments of the present invention are generally directed to Web single sign-on applications, and more particularly, to methods of managing Web single sign-on applications using a common set of URLs for authentication.

Web single sign-on (SSO) solutions (e.g., Tivoli® Access Manager WebSeal) act as web proxies by receiving HTTP/HTTPS requests from a web browser and delivering content from junctioned back-end web application servers. If a request first enters a Web SSO application, URL pattern-matching is used to determine whether the requested resource is protected or not. If a resource is protected, authentication must occur before the request is dispatched to the Web application server. Unprotected resources are dispatched without authentication. This works well for web applications that have distinct URLS for an authenticated flow versus an unauthenticated flow. However, many web applications (including WebSphere® COMMERCE) actually use the same servlets (and thus the same URLS) in both authenticated and unauthenticated flows depending upon user action, where the user is in a particular flow, or system configuration. The SSO application, serving many different web applications, cannot contain the logic to determine that a particular URL, from a particular web application, should be protected in one scenario but not in another. This makes it impossible to SSO enable web applications using the same set of URLS for authenticated and unauthenticated users.

BRIEF SUMMARY

An embodiment of the invention includes a method of managing a web single sign-on (SSO) application with a common set of uniform resource locators (URLs). The method includes defining a first servlet mapping including a description of a protected URL resource pattern, defining a second servlet mapping including a description of an unprotected URL resource pattern, determining display logic support to establish if display logic of the web SSO application supports both the first servlet mapping and the second servlet mapping, and configuring the display logic of the web SSO application based on the determination. The method further includes defining an intercepting filter configured to review a received request for a resource, to determine if a source issuing the request is an authorized source, and redirecting the requesting source to a protected URL resource pattern for the requested resource if the source is an unauthorized source. The method further includes registering URL patterns for the common set of URLs in the intercepting filter, the URL patterns including definitions of the protected URL resource pattern and the unprotected URL resource pattern.

Another embodiment of the invention includes a computer program product. The computer program product includes a computer program with computer executable instructions that, when executed on a computer apparatus, direct a processor of the computer apparatus to execute the computer executable instructions, the computer executable instructions including a method of managing a web single sign-on (SSO) application with a common set of uniform resource locators (URLs). The method includes defining a first servlet mapping including a description of a protected URL resource pattern, defining a second servlet mapping including a description of an unprotected URL resource pattern, determining display logic support to establish if display logic of the web SSO application supports both the first servlet mapping and the second servlet mapping, and configuring the display logic of the web SSO application based on the determination. The method further includes defining an intercepting filter configured to review a received request for a resource, to determine if a source issuing the request is an authorized source, and redirecting the requesting source to a protected URL resource pattern for the requested resource if the source is an unauthorized source. The method further includes registering URL patterns for the common set of URLs in the intercepting filter, the URL patterns including definitions of the protected URL resource pattern and the unprotected URL resource pattern.

Another embodiment of the invention includes a system. The system includes a web browser, a web single sign-on (SSO) application in operative communication with the web browser, and a web application in operative communication with the SSO application. According to the example embodiment, the system is configured to perform a method. The method includes defining a first servlet mapping including a description of a protected URL resource pattern, defining a second servlet mapping including a description of an unprotected URL resource pattern, determining display logic support to establish if display logic of the web SSO application supports both the first servlet mapping and the second servlet mapping, and configuring the display logic of the web SSO application based on the determination. The method further includes defining an intercepting filter configured to review a received request for a resource, to determine if a source issuing the request is an authorized source, and redirecting the requesting source to a protected URL resource pattern for the requested resource if the source is an unauthorized source. The method further includes registering URL patterns for the common set of URLs in the intercepting filter, the URL patterns including definitions of the protected URL resource pattern and the unprotected URL resource pattern.

BRIEF DESCRIPTION OF THE SEVERAL VIEWS OF THE DRAWINGS

These and other features, aspects, and advantages of the present invention will become better understood as the following detailed description is read with reference to the accompanying drawings in which like reference numerals represent like elements throughout the drawings, wherein.

DETAILED DESCRIPTION

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

It is further noted that the terminology used herein is considered consistent with implementations of example embodiments, and is appropriate for description of example embodiments. Furthermore, different terms may be used singularly or in multiple forms to describe components or steps which may be substantially similar. For example, the terms "web," "Web," and "WEB" may be used interchangeably. Furthermore, the terminology "single sign-on," "SSO," and/or other abbreviations representing single sign-on procedures, methods, applications, or other suitable representations may be used interchangeably herein.

It is further noted that as used herein, server resources including servlets, and any terminology used to represent any such resource, may all be used interchangeably herein as example embodiments should not be limited to the particular implementations described, but to all equivalents or suitable server resources. It follows that servlet mapping or resource mapping or request mapping or URL mapping may all be used interchangeably herein. Therefore, all embodiments described using any of the terminology above should be understood to reference all equivalents and noted alternatives, and should not be limited to any particular terms or implementations.

Hereinafter, example embodiments of the present invention will be described in detail. According to example embodiments, a solution is provided involving the addition of a new servlet mapping for all servlets in a web application, allowing support of multiple URLs for the same servlet. In other words, the web application may include a protected and an unprotected version of all resources that may be requested. An intercepting filter deployed on the web application may determine whether incoming requests for unprotected resources are valid (i.e., the unprotected resource being requested is not actually a protected resource), and whether the user has been authenticated by a SSO application or not. If an unprotected resource is requested that actually should be protected, the intercepting filter is responsible for redirecting the request to the corresponding protected resource. The SSO application maintains responsibility for forcing authentication when a protected resource is requested.

Web SSO applications normally act as web proxies by receiving HTTP/HTTPS requests from a web browser and delivering content from junctioned back-end web application servers. Requests passing through the web SSO application are evaluated to determine whether the user needs to be authenticated in order to access the requested resource. This is done through pattern matching on the URL. For example, a pattern such as "/webapp/wcs/stores/servlet" may be registered in a web SSO application. If any URL is requested with that pattern, the web SSO application would stop the request and force unauthenticated users to authenticate before passing the request to the appropriate application server.

A problem introduced in web applications concerns the same URL needing protection (i.e., require a user to be authenticated), but allowing open access under some conditions. For example, a WEBSPHERE COMMERCE URL may resemble "<hostname>/webapp/wcs/stores/servlet/CategoryDisplay?storeId=x".

As an example scenario, two stores selling substantially similar products may be considered. A first store (Store 1) may be open to the public and users of Store 1 may not need to sign on to browse a catalog of the products. A second store (Store 2) may be targeted at a select group of shoppers, and may provide discounted prices on the same products available through Store 1. The proprietors of Store 2, in order to be certain those users whom access has been granted will be allowed to enter Store 2, may employ a methodology for managing sign on with the same URL example proposed above, namely the CategoryDisplay servlet.

A simple approach at a solution to the above example scenario may include registering all URLs that need to be protected, in contrast to defining a pattern in the URL. For example, the following URL may be registered "<hostname>/webapp/wcs/stores/servlet/CategoryDisplay?storeId=2". Users attempting to access this example URL would be forced to authenticate before the request may be dispatched to the Commerce server. It follows from this simple example that as more resources are protected for the Commerce application, the Web SSO application would need to be updated with entire new sets of URLs to protect.

Another example embodiment includes changing a URL path to include a parameter of "protected" or "unprotected". The application may therefore include two URLs for the same resource, for example, "webapp/wcs/stores/servlet/protected/resource1" and webapp/wcs/stores/servlet/unprotected/resource1" The string pattern "webapp/wcs/stores/servlet/protected" may then be registered as requiring authentication with the SSO application. In this manner, new resources may be added and new URLs defined without the need to repeatedly update or notify the web SSO application. Hereinafter, example methodologies are described with reference to five example scenarios of managing Web single sign-on applications, which may utilize the features described above.

Figure 1:
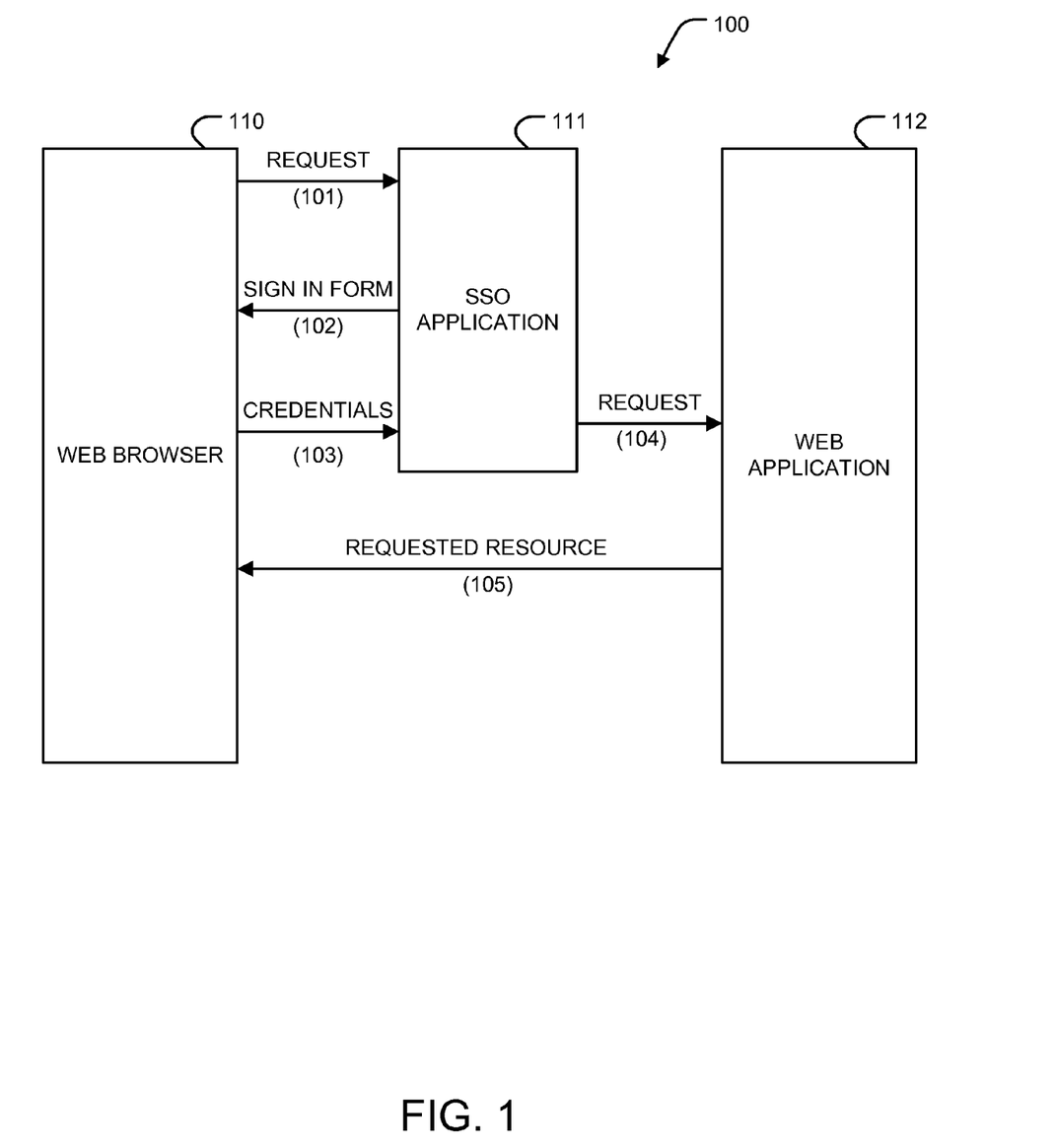
FIG. 1 illustrates an example system, according to an example embodiment.

Turning to FIG. 1, an example system 100 is illustrated. The system 100 may include a web browser 110, a single sign-on (SSO) application 111, and a web application 112. The web browser 110 may be any form of a web browsing application, and thus example embodiments should not be limited to any particular form. The SSO application 111 is a SSO application as described above, notably implementing methods of managing web single sign-on applications (e.g., web application 112). The web application 112 may be any suitable single sign-on web application, and may include protected resources and/or unprotected resources.

A request (101) may be transmitted from the web browser 110 to the SSO application 111. For example, the request may identify one of at least two URLs for a resource. The at least two URLs include a protected and an unprotected URL. Thereafter, the SSO application may determine if the resource is a protected resource. If the resource is protected, a sign in or authentication form 102 may be transmitted. In response to the sign-in form 102, the web browser may transmit credentials 103 to the SSO application. The SSO application may interpret the credentials 103 to determine whether the web browser (i.e., the user of the web browser) may be authenticated by the system.

If the user of the web browser 110 is authenticated based on the credentials 103, a request 104 to access a protected resource of the web application 112 is transmitted. Upon receipt, the web application 112 may transmit the requested resource (see 105) to the web browser 110. It follows from the description provided above that the scenario depicted with the system 100 includes an unauthenticated user of the web browser 110 attempting to access a protected resource of the web application 112.

Figure 2:
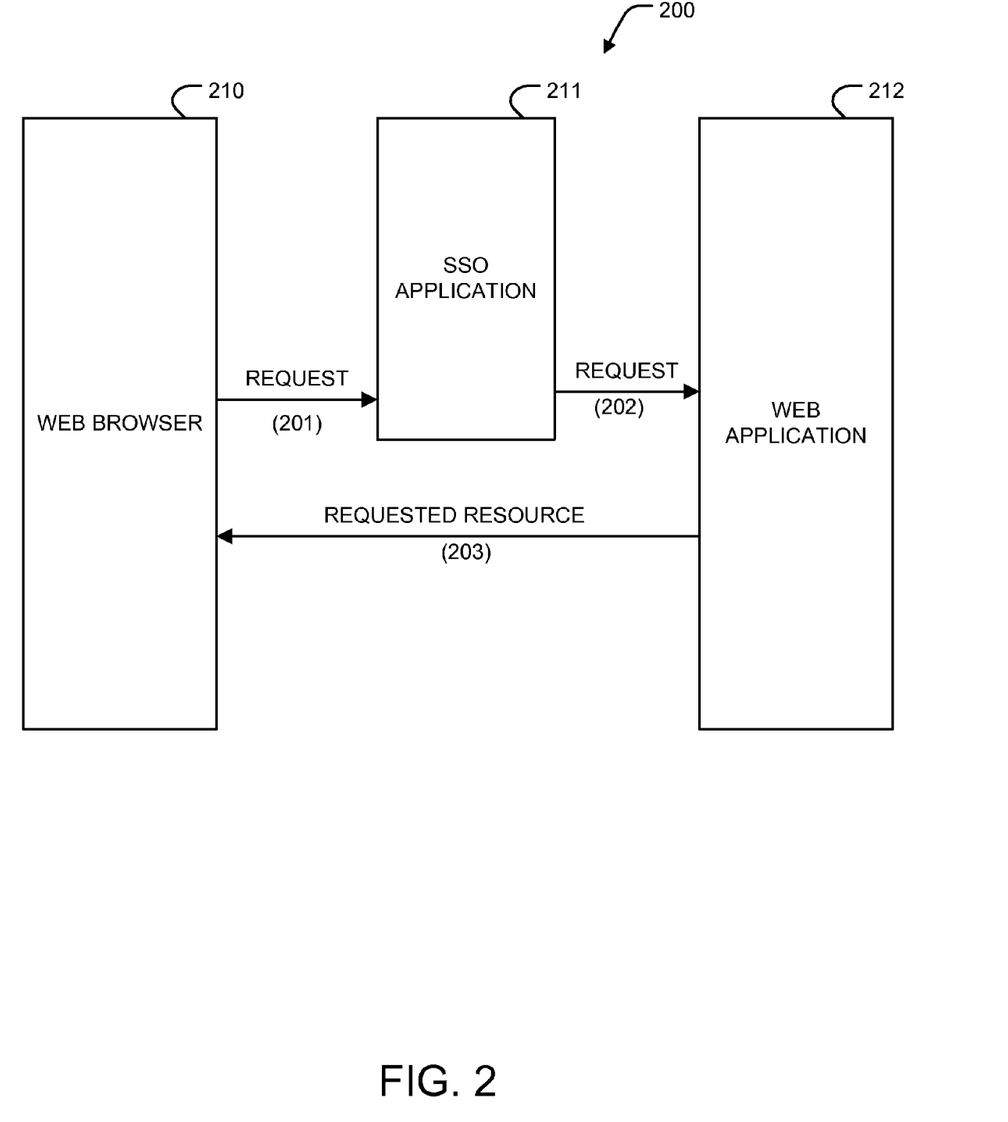
FIG. 2 illustrates an example system, according to an example embodiment.

Turning to FIG. 2, a system 200 is illustrated. The system 200 may include a web browser 210, a single sign-on (SSO) application 211, and a web application 212. The web browser 210 may be any form of a web browsing application, and thus example embodiments should not be limited to any particular form. The SSO application 211 is a SSO application as described above, notably implementing methods of managing web single sign-on applications (e.g., web application 212). The web application 212 may be any suitable single sign-on web application, and may include protected resources and/or unprotected resources.

A request (201) may be transmitted from the web browser 210 to the SSO application 211. For example, the request may identify one of at least two URLs for a resource. The at least two URLs include a protected and an unprotected URL. Thereafter, the SSO application may determine if the resource is a protected resource. If the resource is protected, the SSO application may determine if the request 201 was from an authenticated user of the web browser 210. For example, the user of the web browser 210 may have been authenticated similarly to the authentication scheme described with reference to FIG. 1 beforehand.

If the user of the web browser 210 is authenticated, a request 202 to access a protected resource of the web application 212 is transmitted. Upon receipt, the web application 212 may transmit the requested resource (see 203) to the web browser 210. It follows from the description provided above that the scenario depicted with the system 200 includes an authenticated user of the web browser 210 attempting to access a protected resource of the web application 212.

Figure 3:
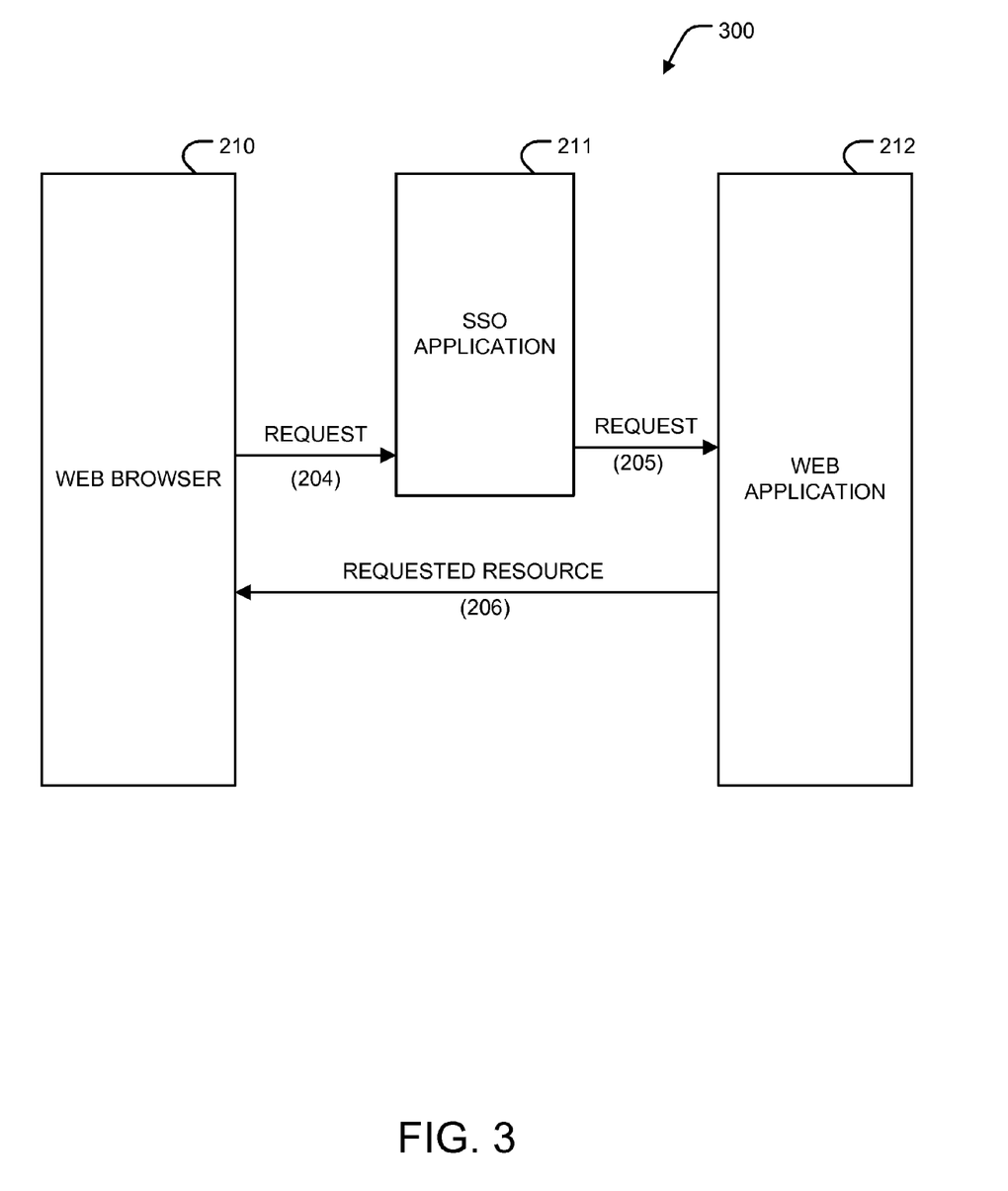
FIG. 3 illustrates an example system, according to an example embodiment.

Turning to FIG. 3, a system 300 is illustrated. The system 300 may include a web browser 210, a single sign-on (SSO) application 211, and a web application 212 which are substantially similar to those depicted in FIG. 2. For example, the web browser 210 may be any form of a web browsing application, and thus example embodiments should not be limited to any particular form. The SSO application 211 is a SSO application as described above, notably implementing methods of managing web single sign-on applications (e.g., web application 212). The web application 212 may be any suitable single sign-on web application, and may include protected resources and/or unprotected resources.

A request (204) may be transmitted from the web browser 210 to the SSO application 211. For example, the request may identify one of at least two URLs for a resource. The at least two URLs include a protected and an unprotected URL. Thereafter, the SSO application may determine if the resource is a protected resource. If the resource is unprotected, a request 205 to access an unprotected resource of the web application 212 is transmitted. Upon receipt, the web application 212 may determine if the resource identified as unprotected should be a protected resource. If it is an unprotected resource, the web application 212 may transmit the requested resource (see 206) to the web browser 210. It follows from the description provided above that the scenario depicted with the system 200 of FIG. 3 includes an authenticated or unauthenticated user of the web browser 210 attempting to access an unprotected resource of the web application 212.

Figure 4:
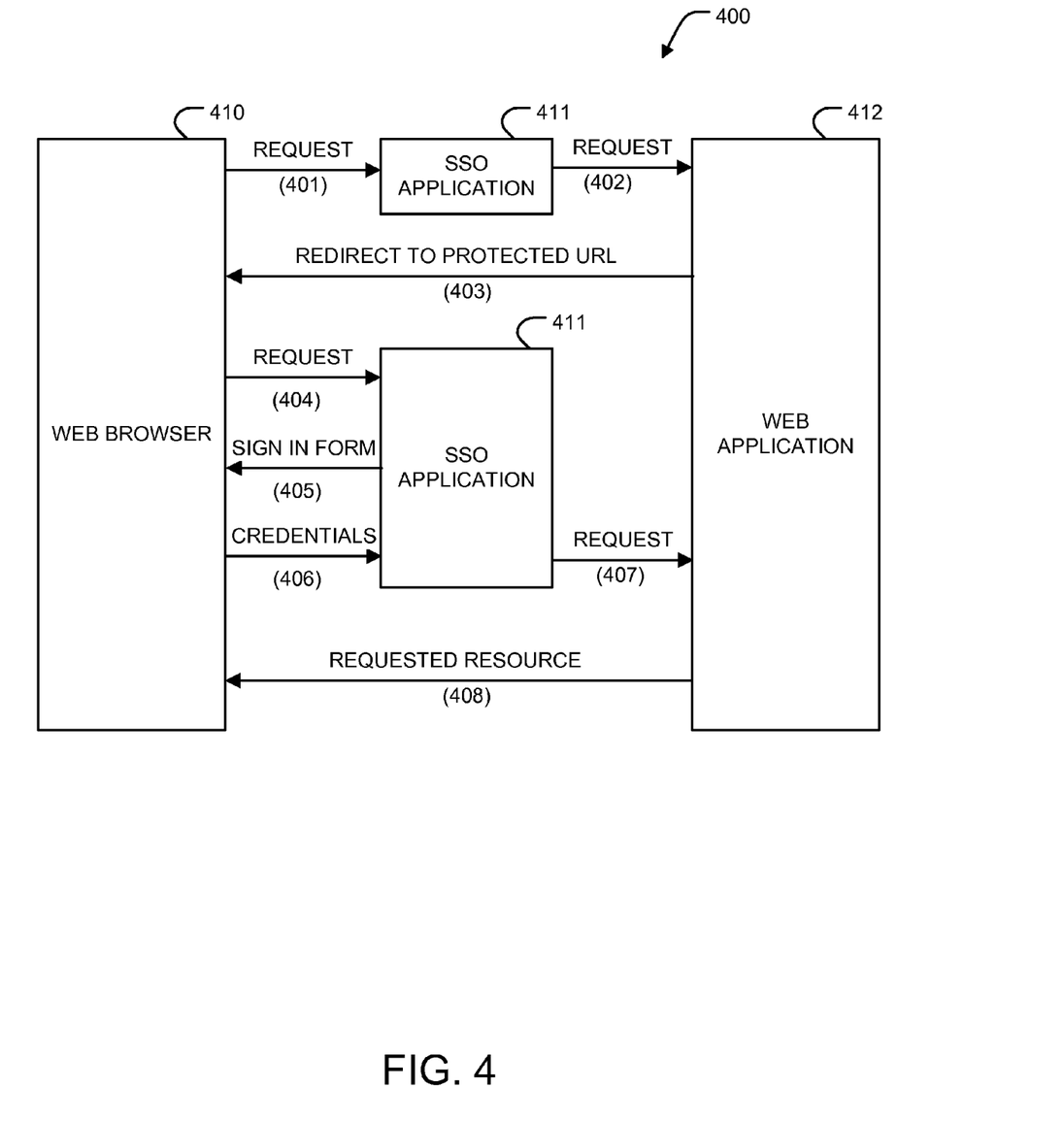
FIG. 4 illustrates an example system, according to an example embodiment.

Turning to FIG. 4, an example system 400 is illustrated. The system 400 may include a web browser 410, a single sign-on (SSO) application 411, and a web application 412. The web browser 410 may be any form of a web browsing application, and thus example embodiments should not be limited to any particular form. The SSO application 411 is a SSO application as described above, notably implementing methods of managing web single sign-on applications (e.g., web application 412). The web application 412 may be any suitable single sign-on web application, and may include protected resources and/or unprotected resources.

A request (401) may be transmitted from the web browser 410 to the SSO application 411. For example, the request may identify one of at least two URLs for a resource. The at least two URLs include a protected and an unprotected URL. Thereafter, the SSO application may determine if the resource is a protected resource based on the request. If the resource is unprotected, a request 402 to access an unprotected resource of the web application 412 is transmitted. Upon receipt, the web application 412 may determine if the resource identified as unprotected should be a protected resource. If the resource should be protected, the web application 412 transmits a redirection to a protected URL (see 403) to the web browser 410.

In response to the redirection, the web browser 410 issues a new request (404) to the SSO application 411 to access the protected resource. In response to the new request (404), a sign in or authentication form 405 may be transmitted. In response to the sign-in form 405, the web browser may transmit credentials 406 to the SSO application 411. The SSO application 411 may interpret the credentials 406 to determine whether the web browser (i.e., the user of the web browser) may be authenticated by the system.

If the user of the web browser 410 is authenticated based on the credentials 406, a request 407 to access a protected resource of the web application 412 is transmitted. Upon receipt, the web application 412 may transmit the resource the requested resource (see 408) to the web browser 410. It follows from the description provided above that the scenario depicted with the system 400 includes an unauthenticated user of the web browser 410 attempting to access a protected resource of the web application 412, where the protected resource was first identified as an unprotected resource in the first request at 401.

Figure 5:
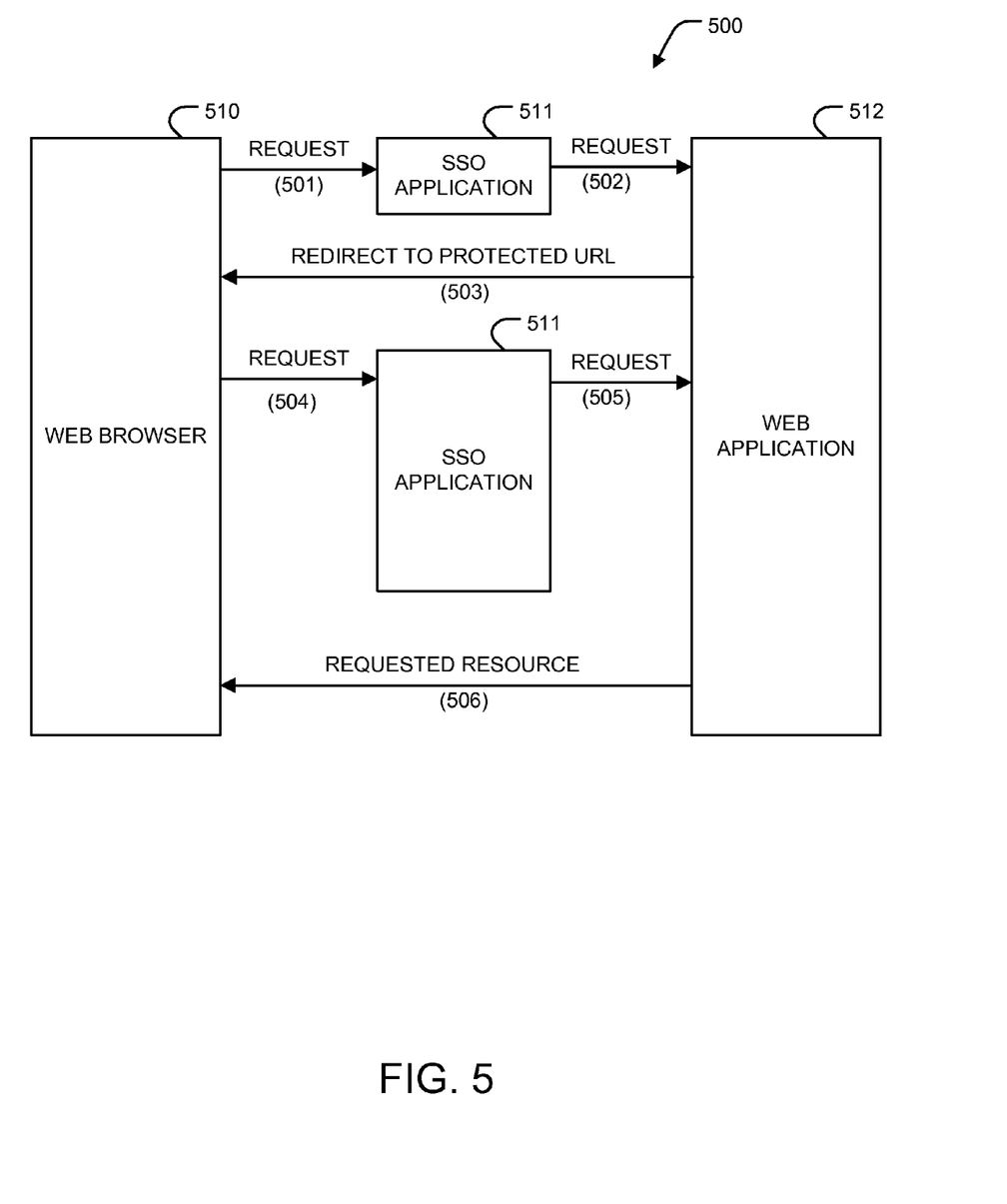
FIG. 5 illustrates an example system, according to an example embodiment.

Turning to FIG. 5, an example system 500 is illustrated. The system 500 may include a web browser 510, a single sign-on (SSO) application 511, and a web application 512. The web browser 510 may be any form of a web browsing application, and thus example embodiments should not be limited to any particular form. The SSO application 511 is a SSO application as described above, notably implementing methods of managing web single sign-on applications (e.g., web application 512). The web application 512 may be any suitable single sign-on web application, and may include protected resources and/or unprotected resources.

A request (501) may be transmitted from the web browser 510 to the SSO application 511. For example, the request may identify one of at least two URLs for a resource. The at least two URLs include a protected and an unprotected URL. Thereafter, the SSO application may determine if the resource is a protected resource based on the request. If the resource is unprotected, a request 502 to access an unprotected resource of the web application 512 is transmitted. Upon receipt, the web application 512 may determine if the resource identified as unprotected should be a protected resource. If the resource should be protected, the web application 512 transmits a redirection to a protected URL (see 503) to the web browser 510.

In response to the redirection, the web browser 510 issues a new request (504) to the SSO application 511 to access the protected resource. If the resource is protected, the SSO application 511 may determine if the new request 504 was from an authenticated user of the web browser 510. For example, the user of the web browser 510 may have been authenticated similarly to the authentication scheme described with reference to FIGS. 1 and/or 4 beforehand.

If the user of the web browser 510 is authenticated, a request 505 to access a protected resource of the web application 512 is transmitted. Upon receipt, the web application 512 may transmit the requested resource (see 506) to the web browser 510. It follows from the description provided above that the scenario depicted with the system 500 includes an authenticated user of the web browser 510 attempting to access a protected resource of the web application 512, where the protected resource was first identified as an unprotected resource in the first request at 501.

As described above, example methodologies described herein provide management of web single sign-on applications using a common set of URLs for authentication. The common set of URLs may include at least two URLs. The at least two URLs may include a protected URL and an unprotected URL. The SSO applications described with reference to FIGS. 1-5 may receive requests from web browsers (i.e., users of web browsers) for access to both protected and unprotected resources. The requests may be filtered and transmitted to web applications based on authentication credentials received from web browsers. Furthermore, the web applications may further filter requests from the SSO applications to determine if requested resources should be protected. Hereinafter, a more detailed description of methods of managing web single sign-on applications is described with reference to FIGS. 6 and 7.

Figure 6:
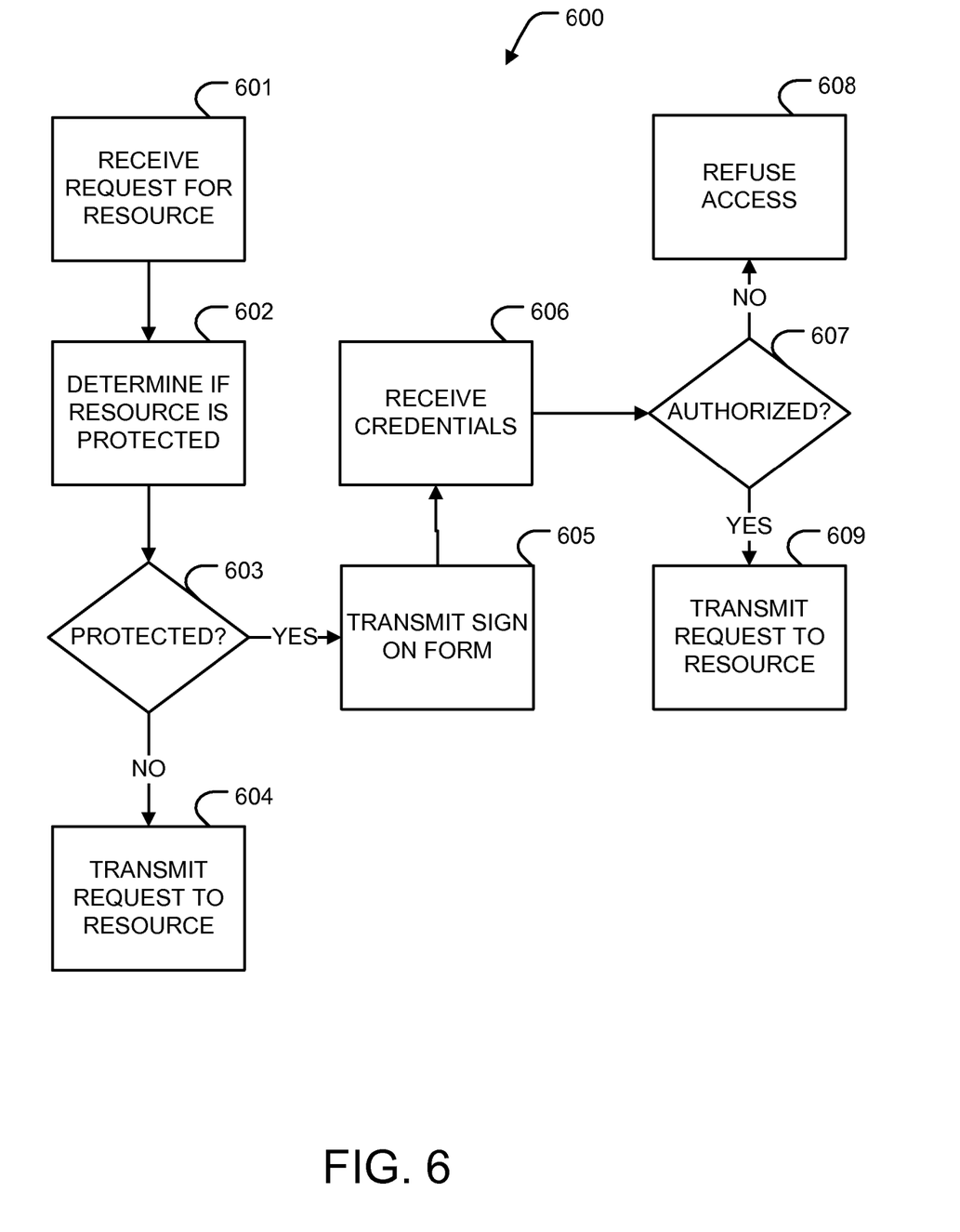
FIG. 6 illustrates a method of managing web single sign-on applications, according to an example embodiment.

According to FIG. 6, a method 600 may include receiving a request for a resource at block 601. The request may identify one of at least two URLs for a resource. The at least two URLs include a protected and an unprotected URL resource pattern. Upon receipt of the request, the method 600 further includes determining if the requested resource is a protected resource at block 602. If the requested resource is an unprotected resource (see 603), the method 600 includes transmitting a request for the resource at block 604.

If the requested resource is a protected resource, the method 600 includes transmitting a sign-on form or authentication form at block 605. Thereafter, the method 606 includes receiving credentials from the requesting source (e.g., a web browser) at block 606. If the requesting source is an authorized or authenticated source (i.e., an authenticated user of a web browser; 607), a request to access the resource may be transmitted at block 609. It is noted that a previous authentication may have been received from the requesting source beforehand. If this is the case, the blocks 605-606 may be omitted, and the method 607 may include simply determining if the requesting source is authenticated or authorized to access the requested resource at block 607.

Turning back to FIG. 6, if the credentials are from an unauthenticated user, or if a previously received set of credentials are determined to be from an unauthorized source, the method 600 includes refusing access to the requested resource at block 608.

Therefore, as described above, example embodiments provide methods of managing web single sign-on applications using a common set of URLs for authentication. The common set of URLs may include at least two URL resource patterns. The at least two URL resource patterns may include a protected URL resource pattern and an unprotected URL resource pattern. The at least two URL resource patterns may be defined such that URLs for requested resources may include either pattern to identify whether a requested resource is protected or unprotected. The at least two URL resource patterns may be defined within a web SSO application or other suitable application such that addition of new resources, whether protected or not, does not require alteration of the web SSO application due to use of URL resource patterns versus entirely new URLs for any additional resource.

Figure 7:
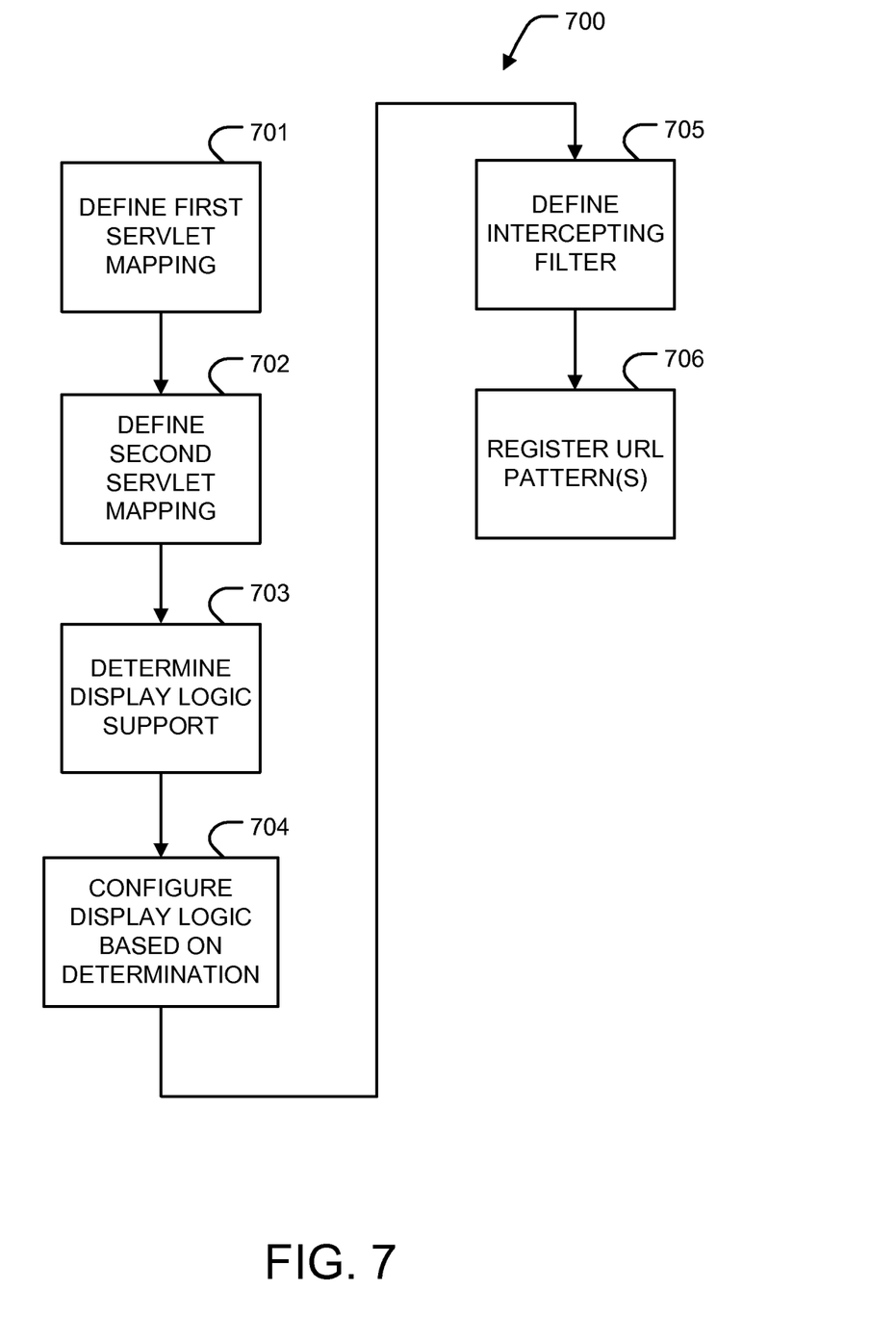
FIG. 7 illustrates a method of managing web single sign-on applications, according to an example embodiment.

Turning now to FIG. 7, a method of managing web single sign-on applications is illustrated. As illustrated, the method 700 includes defining a first servlet mapping at block 701. The first servlet mapping may include a description of a first URL pattern to be associated with a protected or unprotected resource URL. The method 700 further includes defining a second servlet mapping at block 702. The second servlet mapping may include a description of a second URL pattern to be associated with a protected or unprotected resource URL. For example, if the first URL pattern is associated with a protected URL, the second URL pattern should be associated with an unprotected URL. Furthermore, if the first URL pattern is associated with an unprotected URL, the second URL pattern should be associated with a protected URL. In this manner, new resources may be added through use of the URL patterns for protected/unprotected resources without need to register URLS for each new resource.

Turning back to FIG. 7, the method 700 further includes determining display logic support at block 703. For example, if the display logic of a web application does not support more than one servlet mapping, a new logical class defining the new servlet mapping procedure should be created to modify the behavior of the display logic support of the web application. If the display logic supports more than one servlet mapping, modification of the display logic should be substantially minimal. Thus, the method 700 includes configuring display logic based on the determining at block 704.

For example, if the determining of block 703 concludes that the display logic does not support more than one servlet mapping, a new logical class may be implemented extending the original display logic. Furthermore, any portions of the display logic referring to the original logical class which does not support more than one servlet mapping should be modified to refer and be compatible to the new logical class extension.

The method 700 further includes defining an intercepting filter at block 705. The intercepting filter should ensure users are authenticated when accessing protected URLs (e.g., based on the URL patterns described at 701, 702). For example, the intercepting filter is configured to review an incoming or received request to determine if the requested resource is a protected resource. If the requested resource is protected, a user issuing the request should be an authorized user. Thus, the intercepting filter is configured to determine if a user issuing the request is an authorized user. If an unauthorized user is attempting to access a protected resource, the intercepting filter should redirect the user to a protected URL for protected resource requests.

Figure 8:
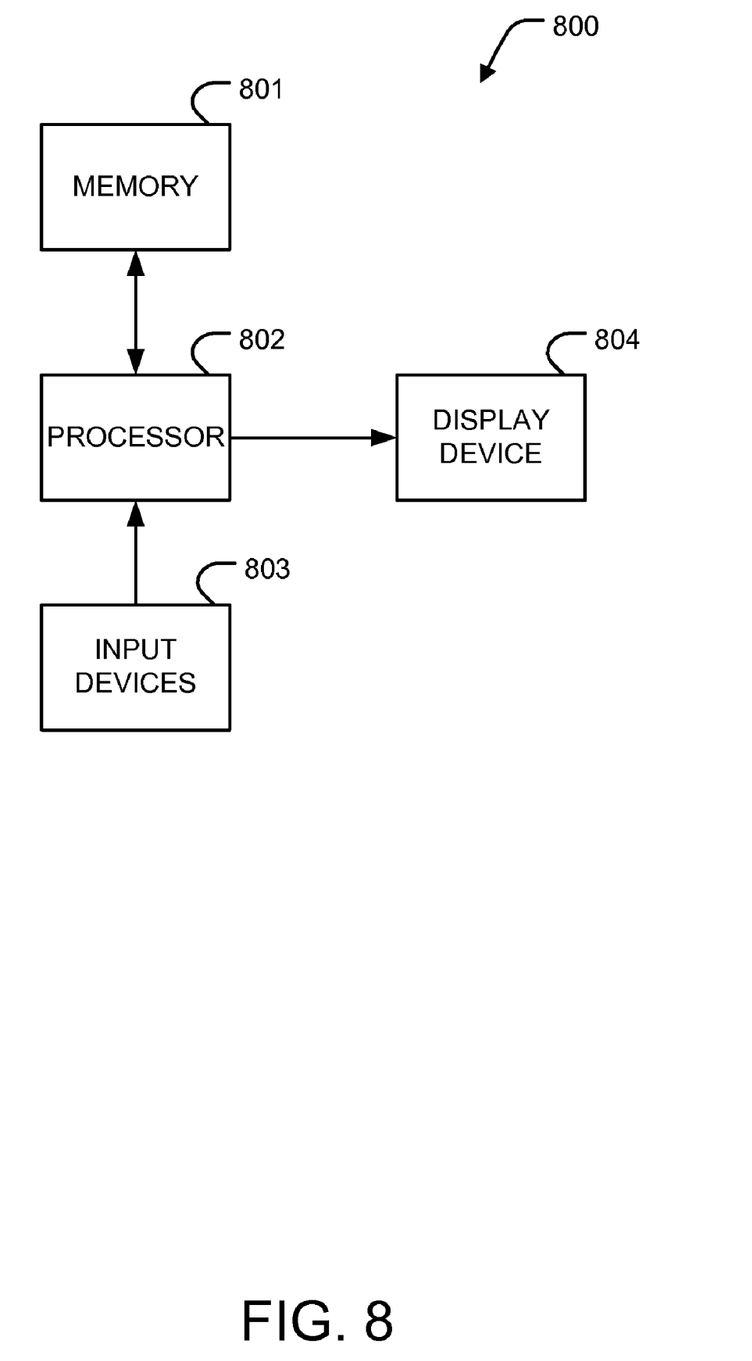
FIG. 8 illustrates a computer apparatus, according to an example embodiment.

Furthermore, according to an exemplary embodiment, the methodologies described hereinbefore may be implemented by a computer system or apparatus. For example, FIG. 8 illustrates a computer apparatus, according to an exemplary embodiment. Therefore, portions or the entirety of the methodologies described herein may be executed as instructions in a processor 802 of the computer system 800. The computer system 800 includes memory 801 for storage of instructions and information, input device(s) 803 for computer communication, and display device 804. Thus, the present invention may be implemented, in software, for example, as any suitable computer program on a computer system somewhat similar to computer system 800. For example, a program in accordance with the present invention may be a computer program product causing a computer to execute the example methods described herein.

The computer program product may include a computer-readable medium having computer program logic or code portions embodied thereon for enabling a processor (e.g., 802) of a computer apparatus (e.g., 800) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

With only some example embodiments of the present invention having thus been described, it will be obvious that the same may be varied in many ways. The description of the invention hereinbefore uses these examples, including the best mode, to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Such variations are not to be regarded as a departure from the spirit and scope of the present invention, and all such modifications are intended to be included within the scope of the present invention as stated in the following claims.

What is claimed is:

1. A method of managing a web single sign-on (SSO) application with a common set of uniform resource locators (URLs), comprising:
defining a first servlet mapping including a description of a protected URL resource pattern;
defining a second servlet mapping including a description of an unprotected URL resource pattern;
determining display logic support to establish if display logic of the web SSO application supports both the first servlet mapping and the second servlet mapping;
configuring the display logic of the web SSO application based on the determination;
defining an intercepting filter configured to review a received request for a resource, to determine if a source issuing the request is an authorized source, and redirecting the requesting source to a protected URL resource pattern for the requested resource if the source is an unauthorized source; and
registering URL patterns for the common set of URLs in the intercepting filter, the URL patterns including definitions of the protected URL resource pattern and the unprotected URL resource pattern.

2. The method of claim 1, further comprising:
receiving a request for a resource, the request identifying one of at least two URLs of the common set of URLs, wherein,
the at least two URLs include the protected URL resource pattern and the unprotected URL resource pattern,
the protected URL resource pattern identifies the requested resource as a protected resource, and
the unprotected URL resource pattern identifies the requested resource as an unprotected resource;
determining if the requested resource is protected based on the received request;
determining if a source requesting the resource is an authenticated source based on a set of received credentials and the received request; and
transmitting a request for the requested resource if the source requesting the resource is an authenticated source.

3. The method of claim 2, further comprising:
transmitting the request for the requested resource if the requested resource is determined to be an unprotected resource.

4. The method of claim 2, further comprising:
transmitting a request for a set of authorization credentials from the source generating the request for the resource.

5. The method of claim 4, further comprising:
receiving the requested set of authorization credentials from the source generating the request for the resource; and
determining if the source is an authorized source based on the set of authorization credentials.

6. The method of claim 5, further comprising refusing access to the requested resource if the source is an unauthorized source.

7. The method of claim 2, further comprising refusing access to the requested resource if the source is an unauthorized source.

8. The method of claim 2, wherein the source generating the request is a user of a web browser, the requested resource is included in a web application of an online system, and the web SSO application is separate from the web browser and the web application.

9. A computer program product including a non-transitory computer usable medium having computer executable instructions embodied therewith that, when executed on a computer apparatus, carry out a method of managing a web single sign-on (SSO) application with a common set of uniform resource locators (URLs), the method comprising:
   defining a first servlet mapping including a description of a protected URL resource pattern;
   defining a second servlet mapping including a description of an unprotected URL resource pattern;
   determining display logic support to establish if display logic of the web SSO application supports both the first servlet mapping and the second servlet mapping;
   configuring the display logic of the web SSO application based on the determination;
   defining an intercepting filter configured to review a received request for a resource, to determine if a source issuing the request is an authorized source, and redirecting the requesting source to a protected URL resource pattern for the requested resource if the source is an unauthorized source; and
   registering URL patterns for the common set of URLs in the intercepting filter, the URL patterns including definitions of the protected URL resource pattern and the unprotected URL resource pattern.

10. The computer program product of claim 9, wherein the method further comprises:
   receiving a request for a resource, the request identifying one of at least two URLs of the common set of URLs, wherein,
      the at least two URLs include the protected URL resource pattern and the unprotected URL resource pattern,
      the protected URL resource pattern identifies the requested resource as a protected resource, and
      the unprotected URL resource pattern identifies the requested resource as an unprotected resource;
   determining if the requested resource is protected based on the received request;
   determining if a source requesting the resource is an authenticated source based on a set of received credentials and the received request; and
   transmitting a request for the requested resource if the source requesting the resource is an authenticated source.

11. The computer program product of claim 10, wherein the method further comprises:
   transmitting the request for the requested resource if the requested resource is determined to be an unprotected resource.

12. The computer program product of claim 10, wherein the method further comprises:
   transmitting a request for a set of authorization credentials from the source generating the request for the resource.

13. The computer program product of claim 12, wherein the method further comprises:
   receiving the requested set of authorization credentials from the source generating the request for the resource; and
   determining if the source is an authorized source based on the set of authorization credentials.

14. The computer program product of claim 12, wherein the method further comprises refusing access to the requested resource if the source is an unauthorized source.

15. The computer program product of claim 10, wherein the method further comprises refusing access to the requested resource if the source is an unauthorized source.

16. The computer program product of claim 10, wherein the source generating the request is a user of a web browser, the requested resource is included in a web application of an online system, and the web SSO application is separate from the web browser and the web application.

17. A system comprising:
   a computer processor;
   a web browser, executed on the computer processor;
   a web single sign-on (SSO) application in operative communication with the web browser; and
   a web application in operative communication with the SSO application; wherein the system is configured to perform a method comprising,
   defining a first servlet mapping including a description of a protected URL resource pattern;
   defining a second servlet mapping including a description of an unprotected URL resource pattern;
   determining display logic support to establish if display logic of the web application supports both the first servlet mapping and the second servlet mapping configuring the display logic of the web application based on the determination;
   defining an intercepting filter configured to review a received request for a resource, to determine if a source issuing the request is an authorized source, and redirecting the requesting source to a protected URL resource pattern for the requested resource if the source is an unauthorized source;
   and registering URL patterns for a common set of URLs in the intercepting filter, the URL patterns including definitions of the protected URL resource pattern and the unprotected URL resource pattern.

18. The system of claim 17, wherein the method further comprises:
   receiving a request from the web browser for a resource of the web application, the request identifying one of at least two URLs of the common set of URLs identifying the web application, wherein,
      the at least two URLs include a protected URL resource pattern and an unprotected URL resource pattern,
      the protected URL resource pattern identifies the requested resource as a protected resource, and
      the unprotected URL resource pattern identifies the requested resource as an unprotected resource;
   determining if the requested resource is protected based on the received request;
   determining if the web browser is an authorized source based on a set of received credentials and the received request; and
   transmitting a request for the requested resource if the web browser is an authorized source.

19. The system of claim 18, wherein the method further comprises:
   transmitting the request for the requested resource if the requested resource is determined to be an unprotected resource.

20. The system of claim 18, wherein the method further comprises:
   transmitting a request for a set of authorization credentials from the web browser.

* * * * *